F. H. ATKIN.
HOSE CLAMP.
APPLICATION FILED OCT. 16, 1920.
1,383,058.  Patented June 28, 1921.
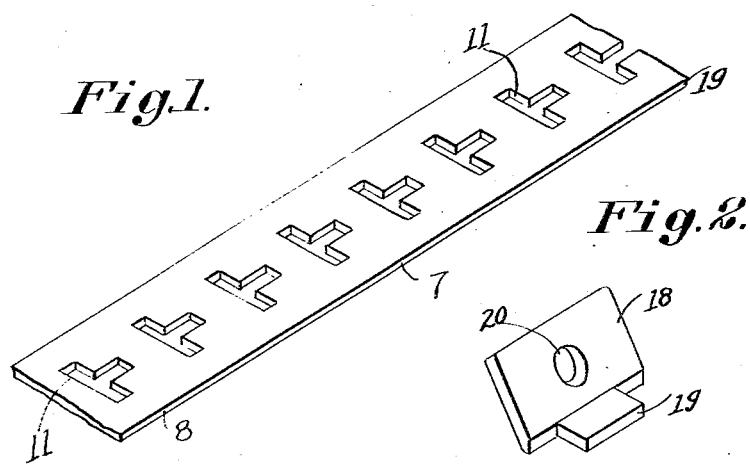
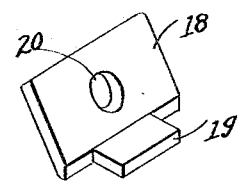
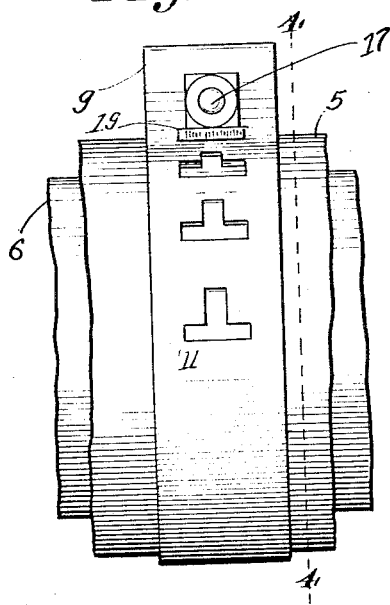
INVENTOR.
Frank H. Atkin.
BY Victor J. Evans
ATTORNEY.

UNITED STATES PATENT OFFICE.

FRANK H. ATKIN, OF SAN FRANCISCO, CALIFORNIA.

HOSE-CLAMP.

1,383,058.  Specification of Letters Patent.  Patented June 28, 1921.

Application filed October 16, 1920. Serial No. 417,283.

*To all whom it may concern:*

Be it known that I, FRANK H. ATKIN, a citizen of the Dominion of Canada, residing at San Francisco, in the county of San Francisco and State of California, have invented new and useful Improvements in Hose-Clamps, of which the following is a specification.

This invention relates to improvements in clamps and has particular reference to clamps which are adjustable and accordingly adaptable for use on various sizes of hose.

One object of this invention is to provide a hose clamp, including a clamping band provided with a series of apertures adapted to receive a clip so constructed that it serves to retain a nut, forming part of my invention, against unscrewing.

Another object of this invention is to provide a clamp which is simple in construction, yet strong and durable, economical in manufacture, very practical in use, and which is adapted to effect a strong and binding action on the part or parts desired to be secured.

Other objects and advantages of the invention will be apparent during the course of the following description:

To those skilled in the art it will be apparent that the purpose of the device is to embrace a hose and pipe length and thereby exert a binding action of the hose against the pipe, thus avoiding a leaking at the connecting points of the two portions. While the drawings show the preferred embodiment of the invention, it is to be understood that the clamp can be applied to a single length of hose and the same object attained.

In the drawings forming a part of this specification and in which like numerals are employed to designate like parts throughout the same, Figure 1 is a perspective view of a flexible band forming part of my invention, Fig. 2 is a perspective view of one detail of my invention, Fig. 3 is a side view of my improved clamp applied to a hose and pipe length, and Fig. 4 is a sectional view taken on the line 4—4 of Fig. 3.

In the drawings wherein for the purpose of illustration is shown a preferred embodiment of my invention, the numeral 5 represents a length of hose which encircles a length of pipe 6. My improved clamp is applied to secure these two portions at the point of connection therebetween.

The clamp consists of a flexible band including a main body portion 7, an end portion 8 terminating in an angularly disposed recessed extension 9, and an opposite end portion 10. The flexible band may be constructed of any material of a spring nature which is readily flexible in order to attain a clamping and tightening of the parts when desired. As shown to advantage in Fig. 1, the band can be made of various lengths and sold accordingly.

In the body portion 7 of the band there are provided a series of T shaped apertures which are formed in the band in the manufacture thereof. When the band is applied to a hose, it completely encircles the same and then continues around the hose to a degree in proportion to the size of the hose which the band encircles. This continuation is best shown to advantage in Fig. 4, and is formed by the end portion 10. The end portion 8 rests upon the portion 10 and thereby assures a tightening effect of the flexible band on the hose.

The main body portion 7 is bent at 12 in order to form a straight portion 13 disposed at a right angle to the bend 12. The straight portion is then folded at 14 and continues in a lateral portion 15 to the end portion 10. Both the straight portion 14 and lateral portion 15 are provided with circular apertures which receive a bolt 17 inserted therethrough.

Disposed between the lateral portion 15 and the extension 9 there is provided a clip, which consists of an upper extremity 18 and a lower lip 19, while a centrally located opening 20 is formed in the upper extremity to likewise receive the bolt 17.

The numeral 21 designates a bevel washer which encircles the bolt 17, while a nut 22 is shown provided on the end of the bolt in order to lock the bolt and hold the parts of the clamp in a fixed position. It will be noted that the lower lip 19 of the clip serves to hold the nut from unscrewing by contact with one side of the nut and thus there is afforded a strong and sure connection for the clamping band.

By having the T shaped apertures or slots 11 formed in the clamping band in the manufacture thereof, it will be evident that novel means are provided to receive both the lip 19 of the clip and the bolt 17 which connects the parts of the clamping band and holds the same against accidental displacement.

From the foregoing description of construction it will be obvious that I have provided a clamp which will very readily sink into the rubber and thereby prevent a creeping or buckling of the clamp when the flexible band is under strain on the hose, and it will be further evident that I have provided means to prevent the clamp from becoming unfastened except when desired.

It is to be understood that the form of my invention herewith shown and described, is to be taken as a preferred example of the same, and that various changes in the shape, size and arrangement of parts may be resorted to without departing from the spirit of the invention or the scope of the subjoined claims.

Having thus described my invention, I claim:—

1. A hose clamp comprising a clamping band having formed therein T shaped apertures, one of the end portions of said clamping band being bent at its extremity to form an angular recessed extension, the other of the end portions adapted to rest beneath the first mentioned end portion, a looped portion formed in the body of the band and provided with recesses, a bolt provided with a nut adapted to penetrate the looped portion and angular extension, and a clip inserted between said looped portion and extension of the body portion, both the said clip and bolt adapted to be received within the T shaped slot of the clamping band, the lip of the clip being adapted to prevent displacement of the nut.

2. A hose clamp comprising a clamping band having formed therein T shaped apertures, one of the end portions being bent at its extremity to form an angular recessed extension, the other of the portions being adapted to rest beneath said first mentioned end portion, a looped portion formed in the body of the band and provided with apertures, said looped portion including a side and vertical portion, a clip positioned between one of the side portions and the angular extension of the first mentioned end portion and adapted to be received in the T shaped extension of the clamping band, means adapted to penetrate the looped portion and angular extension to assure a binding action of the clamping band about a hose length, said means including a bolt adapted to be received in the T shaped slot of the clamping band, said bolt having a nut mounted thereon, and a bevel washer disposed between the nut and angular extension of the clamping band.

In testimony whereof I affix my signature.

FRANK H. ATKIN.